United States Patent [19]

Kania

[11] Patent Number: 5,010,795
[45] Date of Patent: Apr. 30, 1991

[54] APPARATUS FOR CUTTING METAL AND PLASTIC SHEET

[76] Inventor: Jozef Kania, 1036 Johnson's Lane, Mississauga, Ontario, Canada, L5J 2P7

[21] Appl. No.: 936,178

[22] Filed: Dec. 1, 1986

[51] Int. Cl.⁵ .................... B23D 17/08; B23D 23/00
[52] U.S. Cl. .............................. 83/607; 83/542; 83/611; 83/694
[58] Field of Search ............... 83/607, 609, 611, 605, 83/597, 564, 696, 694, 542, 583, 568

[56] References Cited

U.S. PATENT DOCUMENTS

| | | | |
|---|---|---|---|
| 363,524 | 5/1887 | Libbey | 83/605 |
| 2,355,320 | 8/1944 | Nebel | 83/607 |
| 3,279,295 | 10/1966 | Teplitz | 83/694 |
| 3,799,022 | 3/1974 | Nagel et al. | 83/583 |
| 3,813,982 | 6/1974 | Waibel | 83/602 |
| 4,130,037 | 12/1978 | Matthews | 83/607 |
| 4,387,616 | 6/1983 | Ireland | 83/696 |

*Primary Examiner*—Paul A. Bell
*Assistant Examiner*—Eugenia A. Jones
*Attorney, Agent, or Firm*—Ratner & Prestia

[57] ABSTRACT

A sheet material cutter for shearing various widths of sheet material such as aluminum or plastic siding, soffit, facia board and flashing is provided which is readily transportable and useful in cutting a variety of widths of such sheeting. The cutter has a base, a shearing blade of a length greater than the maximum width of sheet to be cut, spaced apart shearing dies mounted on the base and defining a shearing slot through which the blade travels when shearing a width of material, and a post on the base to which the shearing blade is pivotally mounted. The shearing blade includes a pointed section which pierces the sheet material, first the remaining shearing edges of the blade shearing the material to each side of the pierced area to complete cutting of the sheet material. The shearing dies are mounted on plate members of the base such that when the plate members are secured in abutting relationship, a predetermined distance is defined between the shearing die edges to ensure a precision fit of the shearing blade as it passes through the shearing slot adjacent the edges of the shearing dies. In this manner minimum pressure is required in shearing various widths of aluminum and plastic materials without requiring anything other than manual power to operate the cutter.

7 Claims, 3 Drawing Sheets

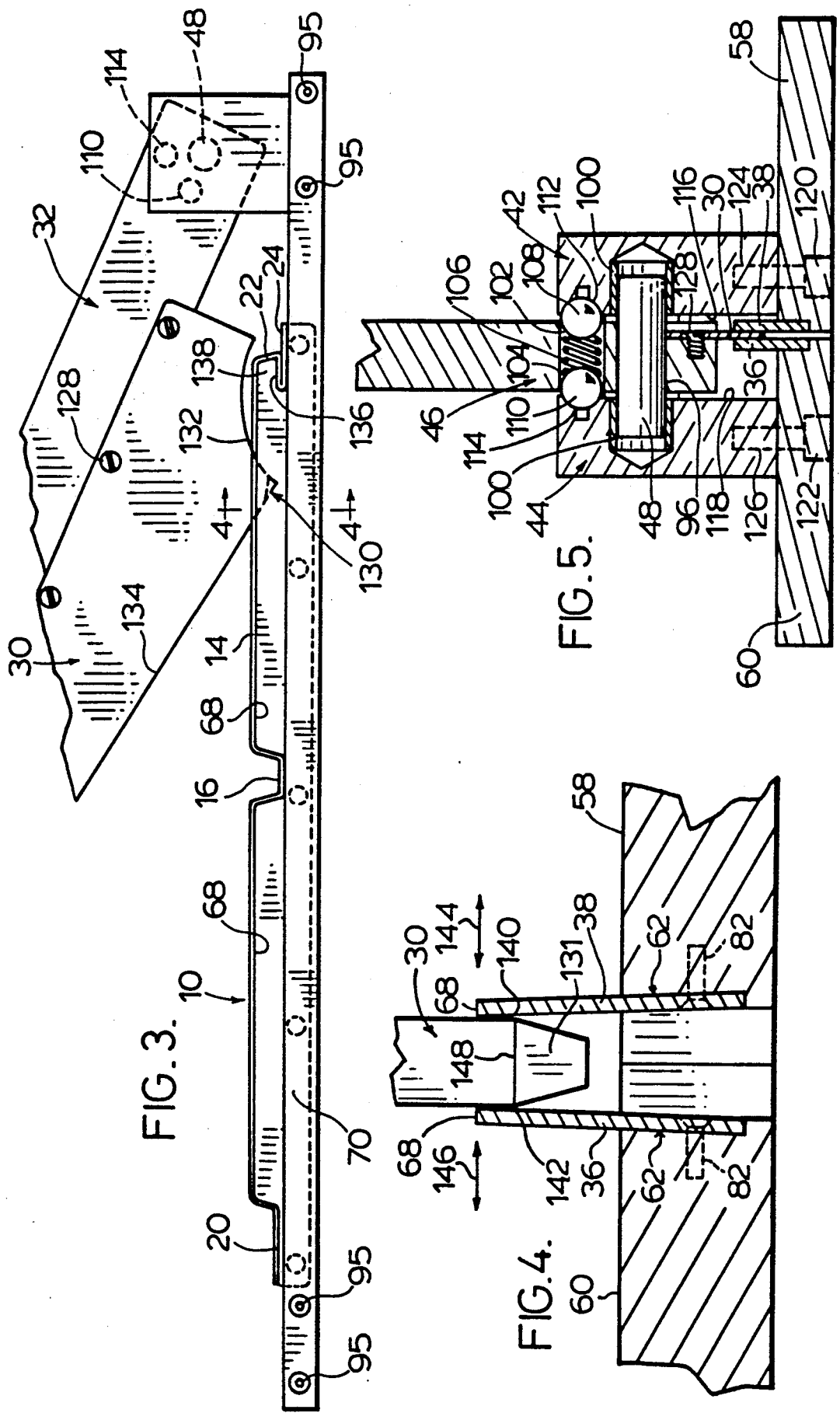

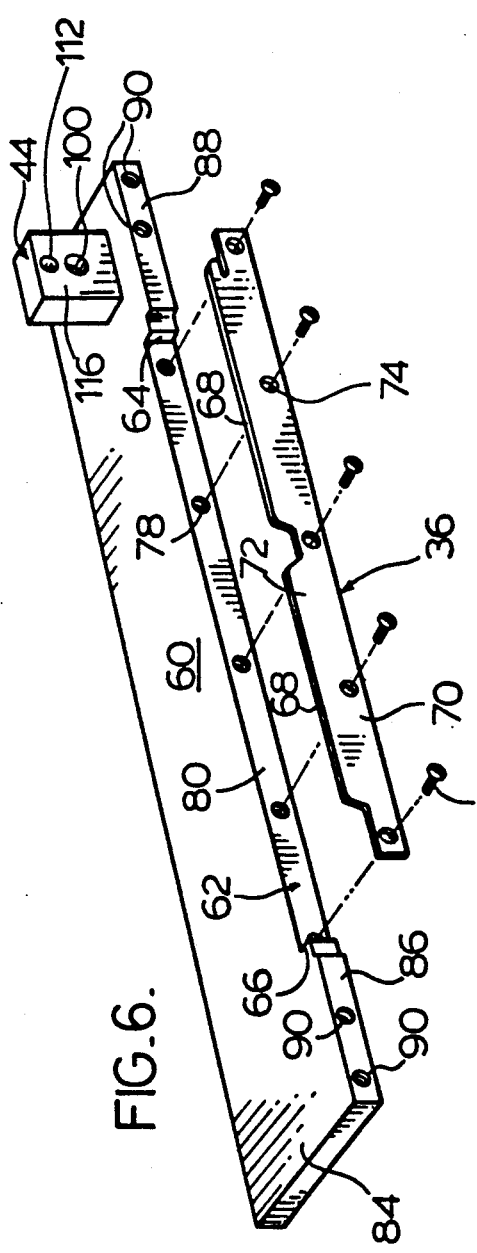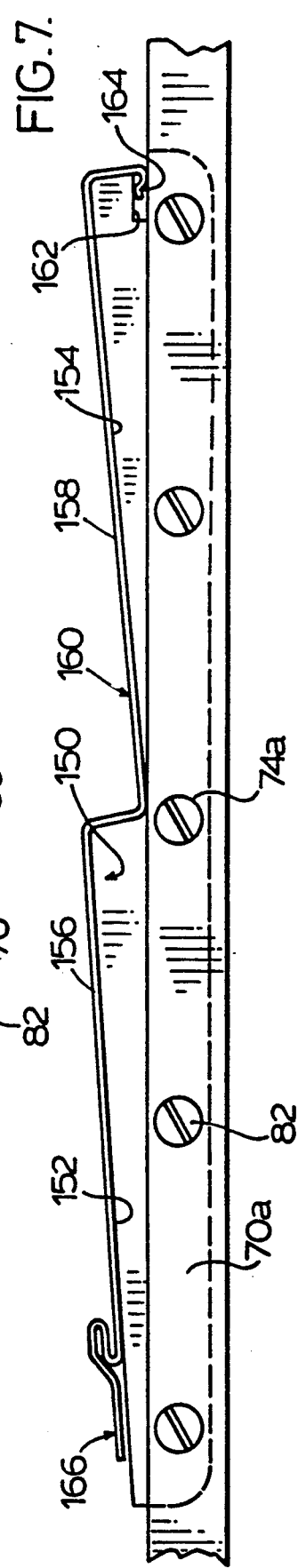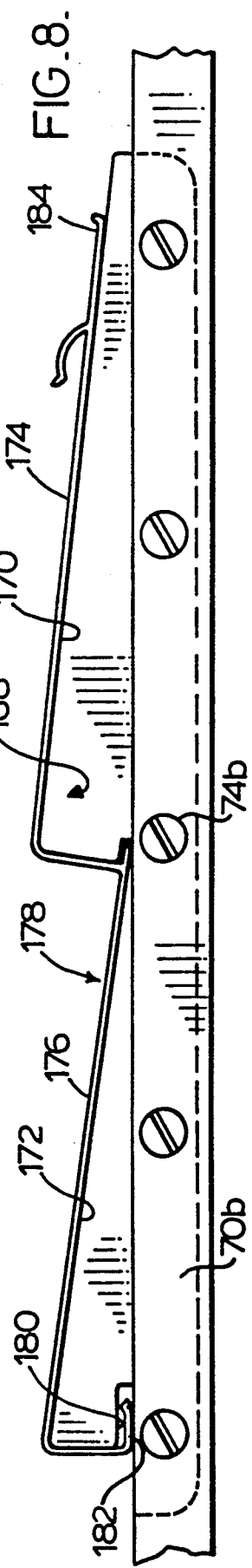

APPARATUS FOR CUTTING METAL AND PLASTIC SHEET

FIELD OF THE INVENTION

This invention relates to a sheet material cutter for shearing various widths of sheet material.

BACKGROUND OF THE INVENTION

Sheet material is used in a variety of ways in assorted types of construction. For example, various widths of sheeting are used in building construction requiring siding, soffit, facia board cover, flashing and the like. In most installations these materials are cut with power saws to expedite installation. However, there are many job sites where power is not available, the installer then has to resort to a hacksaw or tin snips to hand cut materials for installation on the building. The sheet materials may be of either aluminum or plastic and for larger widths of a foot or greater, it can become very difficult to cut by hand. Furthermore, in using standard hand tools to cut the sheeting material, the shape of the material is altered by the use of saws, tin snips or the like so that when the materials are installed they may not interfit properly.

There are sheeting material cutters available, however, they are generally of a construction which is very heavy and therefore difficult to move from job site to job site. Furthermore, the cutters are designed to shear a particular shape of siding material or the like and are therefore not readily adaptable to cut a variety of sheet materials on any one job site. For example, very large and heavy corrugated sheet metal cutters are disclosed in U.S. Pat. Nos. 363,524 and 2,582,933. These patents involve the use of arcuate shaped shear which passes between spaced-apart shear dies which are mounted in place on support blocks for the base of a cutter. The shear dies are rigidly mounted and are set on adjustable beds to provide the desired degree of spacing between the shear dies relative to the shear blade.

A complex sheet metal cutting shear is disclosed in U.S. Pat. No. 2,355,320, the system involves the use of a complex linkage to increase the leverage applied to the shear blade as it cuts the sheet metal. Although the linkage requires less effort during the cutting operation, the linkage adds considerably to the complexity of the design and the weight of the cutter so that it is not easily transported. The shear dies are mounted on the base of the cutter with adjustable stops along the upper edges of the shear dies to establish the desired spacing between the die edges.

Similarly relatively complex cutters are disclosed in U.S. Pat. Nos. 3,714,856 and 4,130,037 for shearing various shapes of sheet materials. The patent to Hall et al like Nebel No. 2,355,320 has a complex linkage mechanism to maintain a desired angular relationship of the shear blade relative to the material being cut. Removable inserts are provided on the shear dies to compensate for sheet materials having stepped portions, to thereby provide support during the cutting operation. However, the major workable portions of the shear dies are fixed in shape and cannot be removed, nor can the spacing between them be precisely adjusted. However, such spacing is not as critical because of the elaborate linkage mechanism which supplies plenty of force in shearing the material. In Matthews U.S. Pat. No. 4,130,037, the shear blade includes a pointed portion which enters the material first and then sections of the blade to each side of the pointed section cuts the remainder of the U-shaped channel. The shear blade has a knife edge which passes through a slot defined by opposing surfaces of a bed which supports the U-shaped channel. Instead of shearing the material, the blade edge actually cuts the material, because of the general U-shape thereof. The one edge of the shear die which abuts the knife edge of the blade, is fixed so that replacement of the entire cutter is required once the edge of the slot becomes worn.

SUMMARY OF THE INVENTION

According to an aspect of this invention a sheet material cutter for shearing various widths of sheet material is provided which is of an efficient design and hence is readily transportable and useful in cutting a variety of shapes of sheeting material.

The sheet material cutter comprises a base, a shearing blade of a length greater than the maximum width of the sheet material to be cut, and spaced apart shearing dies mounted on the base and defining a shearing slot through which the blade travels when shearing a width of sheet material.

The base has a working surface. Means is provided for mounting the spaced apart shearing dies on the base. Each of the shearing dies has a shearing die edge. The mounting means spaces opposing shearing die edges apart to define the shearing slot.

The shearing blade has a shearing edge along its length, the blade has an essentially consistent thickness along its shearing edge which is essentially planar in transverse section to define two spaced apart shearing edges along the blade length. Each shearing edge is proximate a corresponding shearing die edge, each shearing die has an upper and lower portion along its length, and the lower portion of the die is mounted on the base by the mounting means. The upper portion of the die extends appreciably above the plate to provide a cantilever mounting for the die shearing edge while supporting sheet material underside when being cut.

The shearing blade is mounted on a handle. Means is provided for pivotally mounting an end of the handle on the base to position the blade shearing edge in line with the shearing slot. The shearing edge is contoured to present a pointed section which enters the shearing slot first at a location between the ends of the slot but closer to the slot end adjacent the handle mounting means.

The shearing edge to each side of the pointed section of the blade enters the shearing slot at an angle relative to the die shearing edges, the cantilever mounting of upper portions of the shearing dies permit flexing outwardly slightly as needed when the shearing blade shears material along the slot and sheared material enters the slot.

BRIEF DESCRIPTION OF THE DRAWINGS

FIG. 3 is a side elevation of a cutter of FIG. 2;

FIG. 4 is an enlarged view of the shear dies as secured to the base of the cutter of FIG. 1;

FIG. 5 is an end view of the cutter of FIG. 1 taken from the end which includes the hinge mechanism for the cutter;

FIG. 6 is an exploded view of one section of the cutter base with a shear die in position for mounting on the base;

FIG. 7 is a side elevation of an alternative shape for the shear die; and

FIG. 8 is a further alternative configuration for the shear die and supporting alternative design for sheet material.

DETAILED DESCRIPTION OF THE PREFERRED EMBODIMENTS

Figure 1:
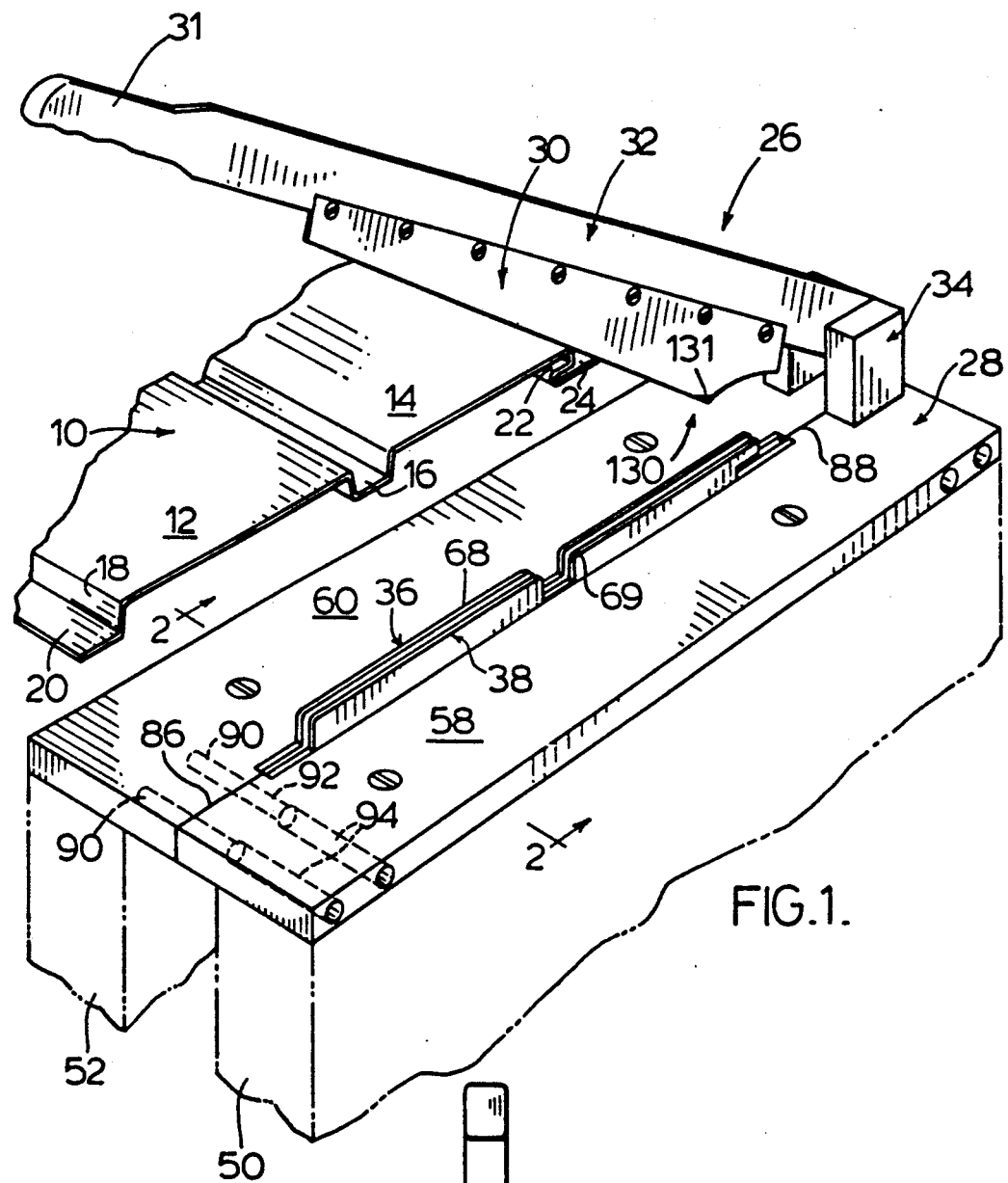
FIG. 1 is a perspective view of the material cutter according to this invention.

For purposes of describing preferred aspects of the cutter according to this invention, the system will be demonstrated in a preferred form for cutting aluminum soffit, aluminum siding and plastic soffit and siding. With reference to FIG. 1, an indeterminate length of aluminum soffit 10 is provided having an irregular shaped section consisting of two raised panels 12 and 14 with an intermediate longitudinally extending rib 16, one edge of the soffit includes a step portion 18 with flange 20, the other edge of the soffit includes a folded over portion 22 with outwardly extending flange 24. When this type of section is cut with tin snips or power saw, the folded over section 22 becomes mangled and hence requires restraightening before use on a building. With the cutter according to this invention, that section of the soffit is readily cut without causing damage thereto.

The cutter 26 of this invention as shown in FIG. 1 consists of a base 28, a shear blade 30 mounted on a handle 32, the handle 32 is pivoted on a stand 34 which is mounted on the base 28, the shear blade 30 passes between opposing shear dies 36 and 38.

Figure 2:
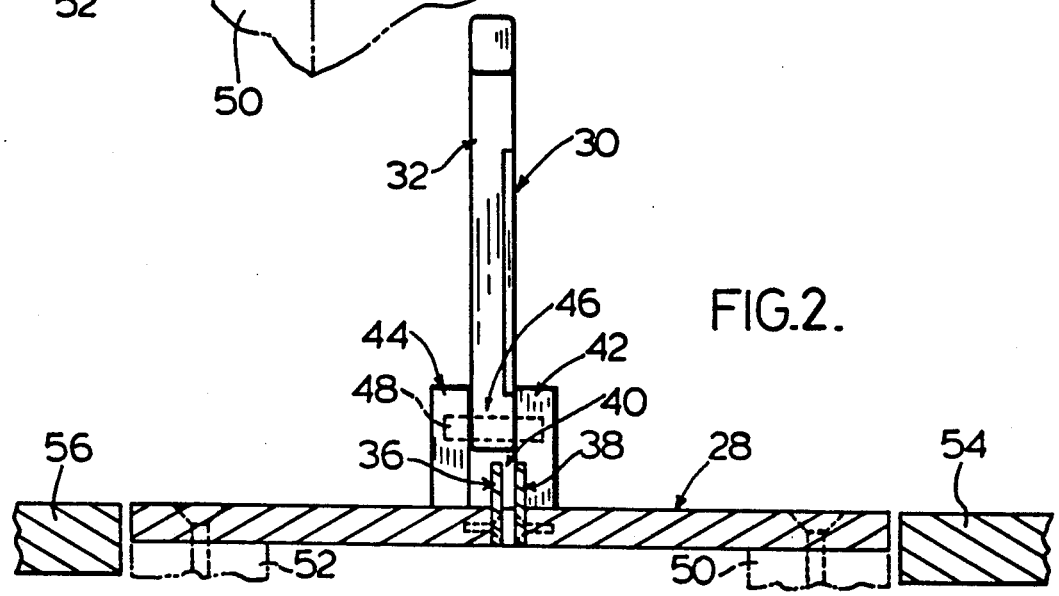
FIG. 2 is a section along the lines 2—2 of FIG. 1.

As shown in FIG. 2, the shear dies 36 and 38 are spaced apart a distance to define the shear slot 40 which extends entirely through the base 28. The post arrangement for pivotally mounting the handle 32 comprises two spaced-apart blocks 42 and 44, which are secured to the base 28 by bolts or the like which extend through the base 28 and into the respective blocks 42 and 44. The handle end 46 is pivotally mounted on a pin shown in dot 48, which in turn is secured in the blocks 42 and 44. The post arrangement 34 is positioned on the base 28 so as to align the shearing blade 30 with the shearing slot 40 to ensure accurate clean cut through the sheet material.

The base 28 may be secured to supports 50 and 52 which, as shown in FIG. 2, are spaced apart sufficiently to allow the blade 30 to project beneath the base 28 when the blade is in its fully lowered position. To assist in use of the cutting device, it is appreciated that supporting tables 54 and 56 may be positioned to each side of the base 28 and of length sufficient to support the extended length of soffit 10. The lower portions of the rib 16, flanges 20 and 24 of the soffit 10 rest on the base 28 and in turn on the tables 54 and 56 which are at essentially the same level.

The base 28 may be constructed of two abutting plate members 58 and 60. As shown in FIG. 6, each plate member includes a recessed portion generally designated 62 which receives the corresponding shear die 36. Plate 60 has a recess depth as defined by recess edges 64 and 66, which is essentially the same depth as the width of the shear die 36. According to this embodiment, the shear die 36 may be formed from a rigid, hardened and ground metal plate, preferably a metal which is corrosion resistant such as stainless steel. The plate is of consistent thickness as indicated by the shear die edge 68.

The plate has a lower portion 70 and an upper portion 72 along its length, the lower portion 70 includes a plurality of spaced-apart apertures 74 which aligned with threaded bores 78 in the plate 60 of the recess surface 80. Threaded Allan screws 82 are used to connect and secure the shear die 36 against the surface 80 of the recess 62 of the plate 60. The upper portion 72 of the shear die is spaced well above the upper surface 84 of the plate, hence the shear die edge 68 is in essence mounted in a cantilever manner above the plate 60.

The other plate 58 is constructed in a similar manner as plate 60, with its shear die 38 secured in position by corresponding fasteners. The plates 58 and 60 include to each side of the recess 62 planar portions 86 and 88. The opposing planar portions 86 and 88 abut one another when the plates are assembled in the manner shown in FIG. 1. In order to secure the plates together, threaded bores 90 as shown in dot in FIG. 1 in plate 60 and also shown in FIG. 6, are in register with corresponding bores 92 formed in plate 58. The bores 92 are not threaded, and are sufficiently large to allow placement of Allan screws or the like in the enlarged bore portions 94. An appropriate Allan screw wrench extends the enlarged bore 94, to effect tightening of the Allan screw to pull the plate sections 58 and 60 together such that they abut. The sizing of the depth of recess 62 is such to define a predetermined distance between opposing surfaces 62 of the recesses in the plates 58 and 60. This predetermined distance in turn determines the spacing between the die edges 68 of shearing die 36 and 69 of shearing die 38, this spacing in turn defines the shear slot 40 as shown in FIG. 2.

With reference to FIG. 5, the handle end 46 is pivotally mounted in the post blocks 42 and 44 by provision of an aperture 96 extending through the handle end, a pin 48 extends through the aperture and is mounted in bushings 100 in each of the posts 42 and 44. The pin 48 is slidably received in the bushings 100 to permit rotation of the handle end 46. The handle end includes two semi-circular recess portions 102 and 104. A spring 106 is positioned between the semi-spherical recesses 102 and 104 in which ball bearings 108 and 110 are positioned, the ball bearings 108 and 110 can therefore move inwardly and outwardly of the handle 46.

Each post 42 and 44 includes a corresponding spherical recess 112 and 114, the spherical recess 112 is shown more clearly in FIG. 6. As the handle is rotated from its uppermost position where the ball bearings 108 and 110 are seated in the recesses 112 and 114, to the position as shown in FIG. 3 where the ball bearings 108 and 110 are now riding against the interior surface 116 and 118 of the posts, the ball bearings move inwardly of the handle against the pressure of spring 106. Hence the spring loaded ball bearings 108 and 110 provide a detent in locating the handle in its uppermost position, this provides for security in operation of the device which prevents the shearing knife 30 falling on the user while positioning the soffit 10 for purposes of cutting.

To secure the posts 42 and 44 on the base plates 58 and 60, Allan screws or the like as shown in dot at 120 and 122 in FIG. 5 may be used, as they extend into the threaded bores 124 and 126 of the posts.

With reference to FIG. 3, the soffit 10 is positioned on the supporting shear die edge 68. The handle 32 which carries the shear knife 30 has the knife secured thereto by a plurality of threaded screws 128. As shown in FIG. 5, the posts are positioned on the plates 58 and 60 so as to align the shear knife 30 with the slot between shear dies 36 and 38.

According to a preferred embodiment of the invention, the shear knife 30 is shaped to include a pointed section 130, as shown in FIG. 3. As the handle 32 is moved downwardly the pointed section 130 is the first to penetrate the soffit panel 14 and extend through the slot between the dies 36 and 38. The knife includes to each side of the pointed section 130, a first arcuate portion 132 and a second portion 134 which extends rearwardly of the handle 32. As continued pressure is exerted downwardly on the handle 32, the edges 132 and 134 of the shearing knife continue to shear the panel 14 progressively into panel 10 and eventually shears the opposite edges of the soffit including flanges 20 and 24. As the material is sheared, a thin ribbon of material is cut from the sheet material and displaced downwardly through the shear slot between the opposing shear dies 36 and 38. With the underside of the system open as shown in FIG. 2, the ribbons of metal fall away from the cutter. As shown in FIG. 3, the cutter dies have their lower portions 70 secured to the recess surfaces, the upper edges 68 are mounted in a cantilever manner above the upper surfaces 84 of the plates 58 and 60. The flanges 20 and 24 rest on the upper surfaces of the plates as does the lower portion of the rib 16. As the cutter passes through the material, the material is fully supported on its underside. With the pointed portion 130 penetrating the material first, with continued movement of the handle 32 in the downward direction, the arcuate portion 132 of the shearing blade passes through the overturned portion 22 of the material to effect cutting thereof as fully supported by the section of the die in the area of folded over portion 22. Such support is provided in the die by way of an undercut groove 136 which receives the flange 24 and a portion of the folded over part 22. A tongue 138 extends above the undercut groove 136 to support the remainder of the folded over portion 22. As the cutting edge 134 proceeds through the material, the cutting edge 132 proceeds in the opposite direction, hence there is a balancing of forces on the material as the knife shears through the material to provide a stabilizing aspect in holding the material on top of the die shear edges 68.

In view of the system being hand operable as shown in FIG. 1, by grasping the hand grip 31 of the handle 32, the shearing action should require a minimum of effort to facilitate use in the field. This is accomplished by firstly providing a handle 32 with a long section to the hand grip 31 such that as the handle is pivoted about the pin 48, increased leverage is applied to the cutting edge of the shear blade 30 in accordance with well known principles of physics.

Another aspect which facilitates shearing of the material with the minimum of effort is to position the die edges 68 as shown in FIG. 4 such that they are very close to, if not touching, the shearing edges 140 and 142 of the shearing blade 30. The shearing dies 36 and 38, as described with respect to FIG. 6, are secured to the surfaces 62 of the recesses by fasteners 82. The surfaces 62 may be sloped slightly such that the dies 36 and 38 as they extend above the plates 58 and 60 converge slightly towards one another.

To facilitate entry of the blade into the slot area between die edges 68, the pointed section 130 of the blade includes a sharpened point 131, as shown in FIG. 4. The point 131 is considerably narrower than the remaining width of the blade as defined between shear edges 140 and 142. The pointed section 131 hence acts as a lead in of the shearing blade between the shearing dies 36 and 38. Once the lead in portion is positioned between the die edges 68 of the dies 36 and 38, and in providing a cantilever mounting of the die edges 68, the die edges are permitted to flex slightly in the direction of arrows 144 and 146 to accommodate the width of the blade 30 as defined by the planar face 148. Such arrangement not only accommodates variation in the thickness of the blade, but also accommodates misalignment of the blade as it travels along the length of the shearing groove. In this manner, close tolerances may be achieved between the shearing edges 140 and 142, and the corresponding shearing edges 68 of the shearing dies 36 and 38. This close tolerance cutting of the metal between the edges 140 and 142 and the die edges 68, requires minimum of effort. It has been found that as the space increases, more and more effort is required to effect the shearing or cutting action. Hence, by way of this mounting of the shear dies 36 and 38, in relationship to the shear blade, an efficiently lightweight constructed unit is provided which is readily usable in the field, requires minimum effort of operation and is inexpensively constructed. It is appreciated that the blade 30 and the dies 36 and 38 should be formed of a suitable corrosion resistant material, preferably such material will be of a usable grade of stainless steel. The remaining components of the cutter may be formed of cast or machined aluminum which will provide the necessary structural support during the cutting operation.

In view of the particular way of mounting the shear dies 36 and 38 on the plates 58 and 60, it is possible to readily break down the cutter by removing the Allan screws 95 as shown in FIG. 3 to separate the plates 58 and 60, the dies 36 and 38 may be removed from the plates by releasing the fasteners 82. Such replacement of the dies provides increased flexibility in the use of the unit on site. The workmen may carry several sets of dies which are of shapes usable in cutting soffit, siding, facia board, flashing and the like. Examples of alternative die shapes are shown in FIGS. 7 and 8. The die shapes are specifically adapted to permit shearing of aluminum siding and plastic siding. As shown in FIG. 7, the die 150 comprises two ramped die edges 152 and 154 to support the undersides of the panel portions 156 and 158 of the siding 160. The ramp portion 154 includes an undercut 162 to accommodate the flange edge 164 with the same cutter blade as shown in FIG. 3, the pointed section 130 of the blade pierces panel 158 and then cuts the siding in both directions until the flange 164 one end is cut as well as the flange 166 the other is sheared. As with the die arrangement of FIG. 6, the majority of the die edge 152, 154 is above the plates 58 and 60 so as to provide the cantilever mounting thereof and hence the advantages obtained as discussed with respect to FIG. 4.

With reference to FIG. 8, an alternative die 168 is provided having ramped die edges 170 and 172, which support the panel sections 174 and 176 of the plastic siding 178. It is appreciated that there are various plastics which are suitable for use in building construction. The preferred plastic for siding, soffit and the like is vinyl. An undercut section 180 is provided to accommodate the flange 182 at the other end flange 184 rests on the die edge 170. All dies have their lower portion 70, 70a and 70b of FIGS. 6, 7 and 8 with the same location of apertures 74, 74a and 74b, in this manner, the dies are readily interchangeable with the same fasteners 82.

Accordingly, the material cutter of this invention provides a rugged, lightweight system which may used to shear various types of sheet material including aluminum and plastic soffit, siding, facia board cover, flashing and the like. The blade and shear die arrangement does not require the use of sharpened edge portions. With the mounting of the die blades in the manner shown, consistent reproducible results are obtained in the effortless use of the cutter in shearing various types of material. By conforming the shape of the die blades to the shape of the underside of the material to be cut, full support is provided such that minimal bending or warping of the shape of the section results, hence the material as cut can be readily applied without having to rework the edges of the cut sections before installation.

Although preferred embodiments of the invention are described herein in detail it will be understood by those skilled in the art that variations may be made thereto without departing from the spirit of the invention or the scope of the appended claims.

The Embodiments Of The Invention In Which An Exclusive Property Or Privilege Is Claimed Are Defined As Follows:

1. A sheet material cutter for shearing various widths of sheet material comprising a base, a shearing blade of a length greater than the maximum width of sheet material to be cut, and spaced apart shearing dies mounted on said base and defining a shearing slot through which said blade travels when shearing a width of sheet material, said base having a working surface, means for mounting said spaced apart shearing dies on said base, each of said shearing dies having a shearing die edge, said mounting means spacing opposing said shearing die edges apart to define said shearing slot, said shearing blade having an essentially consistent thickness along its length which is essentially planar in transverse section to define two spaced apart shearing edges along said blade length, each said blade shearing edge being proximate a corresponding said shearing die edge as said blade travels through said slot, each said shearing die having a lower portion along its length secured on said base by said mounting means and one or more upper portion extending appreciably above said working surface to provide a cantilever mounting for said die shearing edge, said shearing die upper portions supporting sheet material underside when being cut, said shearing blade being mounted on a handle, means for pivotally mounting an end of said handle on said base to position said blade shearing edge in register with said shearing slot, said blade shearing edge being contoured to present a pointed section which enters said shearing slot first at a location intermediate ends of said slot and close to said slot end adjacent said handle mounting means, said blade shearing edge to each side of said pointed section of said blade entering said shearing slot at an angle relative to said die shearing edges, said shearing die upper portions being of consistent thickness along their length and of sufficient height above said base relative to said thickness of said shearing die to permit outward flexing in said cantilever mounted upper portions thereof upon engagement by said blade, said cantilever mounted upper portions of said shearing dies flexing outwardly slightly as needed when said shearing blade shears material along said slot and sheared material and said blade enter said slot.

2. A sheet material cutter of claim 1, wherein said base comprises two abutting plate members having parallel opposing edge portions, each said plate member edge portion having a recess to receive one of said shearing dies, each recess having a surface on which one of said shearing dies is mounted, each said edge portion having a planar face portion to each side of said recess, said abutting plate members having said opposing planar face portions abutting one another to define a predetermined distance between said surfaces, said predetermined distance spacing opposing shearing die edges apart to define said shearing slot.

3. A sheet material cutter of claim 2 wherein said shearing dies are replaceable, each set of shearing dies having matching die edges configured to support material underside of a particular shape.

4. A sheet material cutter of claim 3 wherein said sets of shearing dies are configured to support sheet material in form of aluminum or plastic soffit, siding, facia board and building flashing.

5. A sheet material cutter of claim 4 wherein said dies and blade are formed of a corrosion resistant steel.

6. A sheet material cutter of claim 2 wherein said shearing die edges include recessed portions which are flush with said plates to accommodate ribs in sheet material to be cut, plates supporting ribs of such sheet material on each side of said shearing dies.

7. A sheet material cutter of claim 2 wherein said plate members are secured together in abutting relationship by releasable connectors.

* * * * *